United States Patent
McCune et al.

(10) Patent No.: US 9,791,835 B2
(45) Date of Patent: Oct. 17, 2017

(54) PV STOP POTENTIAL VOLTAGE AND HAZARD STOP SYSTEM

(71) Applicant: Chuck McCune, Albuquerque, NM (US)

(72) Inventors: Chuck McCune, Albuquerque, NM (US); Maxim K. Rice, Albuquerque, NM (US); Scott Richard Wilson, Corrales, NM (US)

(73) Assignee: Chuck McCune, Albuquerque, NM (US)

( * ) Notice: Subject to any disclaimer, the term of this patent is extended or adjusted under 35 U.S.C. 154(b) by 382 days.

(21) Appl. No.: 14/204,395

(22) Filed: Mar. 11, 2014

(65) Prior Publication Data
US 2015/0370225 A1    Dec. 24, 2015

Related U.S. Application Data

(60) Provisional application No. 61/778,048, filed on Mar. 12, 2013, provisional application No. 61/819,640, filed on May 5, 2013.

(51) Int. Cl.
| G05D 17/00 | (2006.01) |
| G05D 11/00 | (2006.01) |
| G05D 9/00 | (2006.01) |
| G05D 5/00 | (2006.01) |
| G05B 9/02 | (2006.01) |
| H01H 9/16 | (2006.01) |

(52) U.S. Cl.
CPC ............... *G05B 9/02* (2013.01); *H01H 9/168* (2013.01); *H01H 2300/03* (2013.01)

(58) Field of Classification Search
USPC ............................................. 307/77, 80, 130
See application file for complete search history.

(56) References Cited

U.S. PATENT DOCUMENTS

| 4,628,306 A | 12/1986 | Root et al. |
| 8,242,634 B2 | 8/2012 | Schatz et al. |

(Continued)

OTHER PUBLICATIONS

McCune, "PV Stoptm—Potential Voltage and Hazard Stop System for Licensing & Distribution under the Trademark", http://solarprofessional.com/resources/press/mccune-works-inc/pv-stoptm-potential-voltage-and-hazard-stop-system-for-licensing, Jun. 14, 2013.

(Continued)

*Primary Examiner* — Mohammad Ali
*Assistant Examiner* — Md Azad
(74) *Attorney, Agent, or Firm* — Jeffrey D. Myers; Justin R. Jackson; Peacock Myers, P.C.

(57) ABSTRACT

A system to interrupt the line or supply side power or charged system of any building, appliance, process, and the like, so as to render the system without charge or current output outside of the junction box/enclosure or equipment load supply connection so that emergency first responders or solar/any technician, authorized personnel in any field, system maintenance crew may avoid electrocution, chemical or machine/appliance hazard in the presence of fire, explosion, structural failure/compromise, moisture, flammables, caustics, hazmat, water stream, mist, fogging, physical damage or servicing of the system. The system can be engaged for any anticipated disaster such as fire, hurricane, tornado, earthquake, flood, and the like.

16 Claims, 13 Drawing Sheets

(56) References Cited

U.S. PATENT DOCUMENTS

| | | |
|---|---|---|
| 8,446,042 B2 | 5/2013 | Bundschuh et al. |
| 8,446,043 B1 | 5/2013 | Bundschuh et al. |
| 8,461,718 B2 | 6/2013 | Bundschuh et al. |
| 8,471,408 B2 | 6/2013 | Bundschuh et al. |
| 8,854,193 B2 | 10/2014 | Makhota et al. |
| 2009/0084426 A1 | 4/2009 | Fornage et al. |
| 2010/0071744 A1 | 3/2010 | Peurach et al. |
| 2010/0139734 A1 | 6/2010 | Hadar et al. |
| 2010/0321148 A1* | 12/2010 | Gevorkian ........ H01L 31/02021 340/3.1 |
| 2011/0218687 A1 | 9/2011 | Hadar et al. |
| 2012/0033392 A1 | 2/2012 | Golubovic et al. |
| 2012/0316802 A1 | 12/2012 | Presher, Jr. et al. |
| 2013/0307336 A1 | 11/2013 | Bundschuh et al. |
| 2013/0314096 A1 | 11/2013 | Bundschuh et al. |
| 2013/0314236 A1 | 11/2013 | Warren |
| 2013/0320767 A1 | 12/2013 | Huang et al. |
| 2013/0320778 A1 | 12/2013 | Hopf et al. |
| 2014/0027069 A1 | 1/2014 | Oppizzi |

OTHER PUBLICATIONS

"Rapid Shutdown Systems (RSS)", http://bentek.com/solar-products/safety-systems/rapid-shutdown-systems/, 1-2.

"Remote Solar Isolator—Safety Switch for Solar", http://remotesolarisolator.com/, 1-5.

"Solar PV Emergency Shut Down Procedure", http://www.placefirst.co.uk/solar-pv-emergency-shut-down-procedure/, 1-3.

"SolarMagic SM 3320-RF-EV Slar Power Optimizer with RF Communications", http://www.ti.com/tool/solarmagic-solarpoweroptimizer-ref, 1-3.

"The Santon Emergency Switch Firefighter Safety with Photovoltaic Installation", http://www.santonswitchgear.com/fileadmin/user_upload/Afbeeldingen/EmergencySwitchFireFighterSafety/Emergency_Switch_Firefighter_Safety_june2010.pdf, 1-5.

"Tigo Energy PV-Safe", http://www.tigoenergy.com/sites/default/files/pv-safe_onepager.pdf, 1.

* cited by examiner

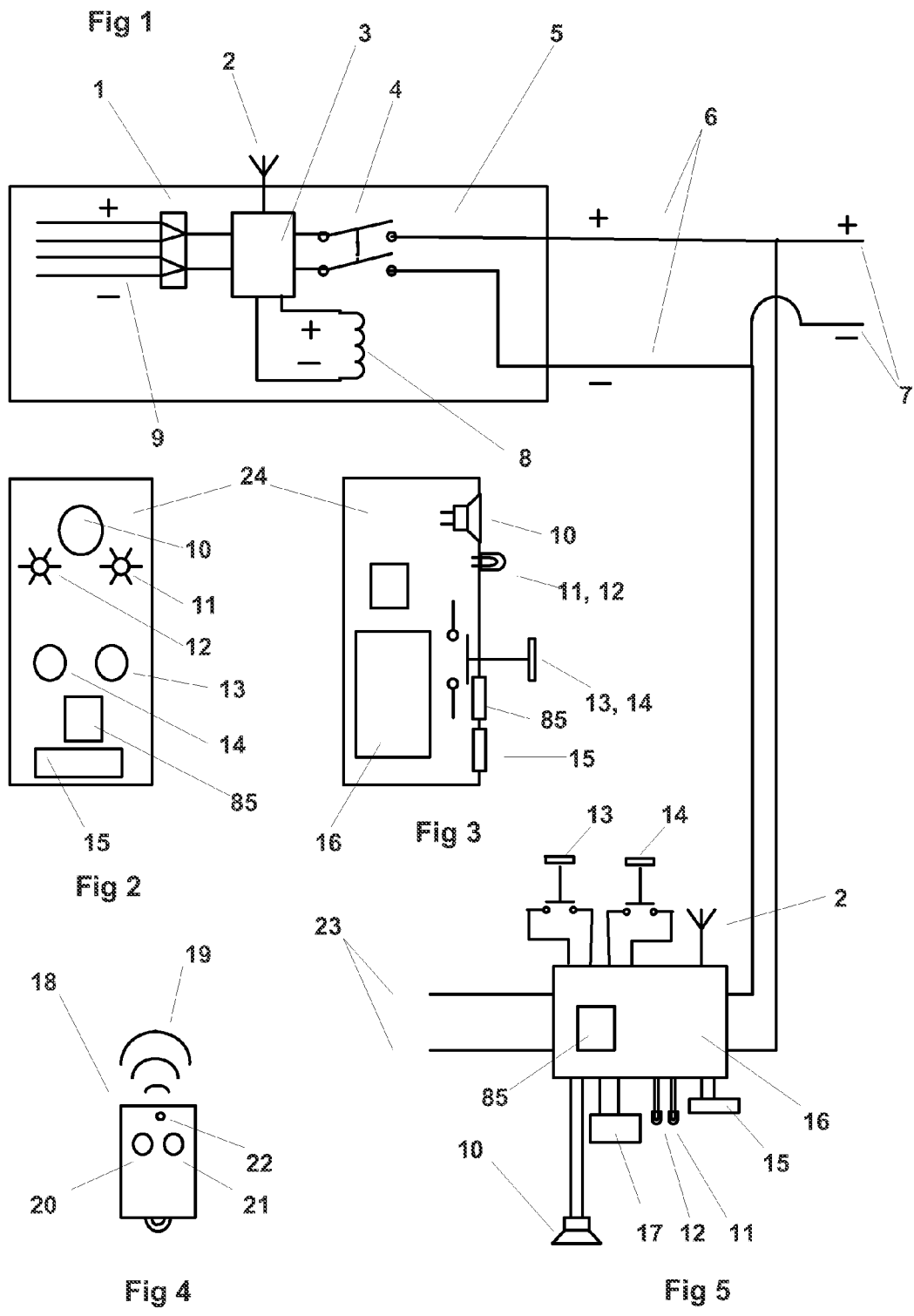

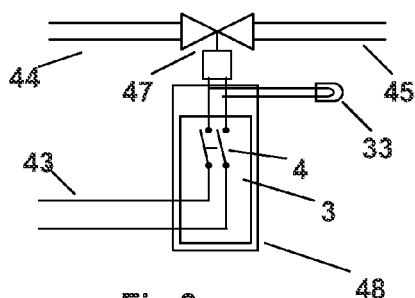
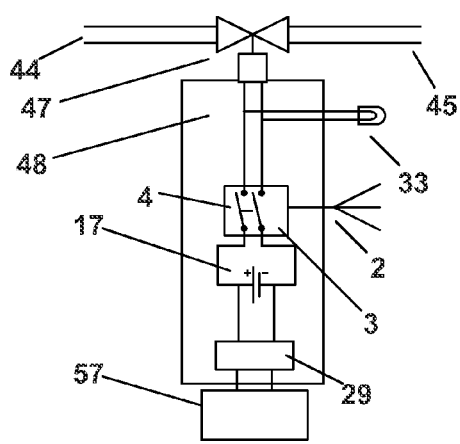
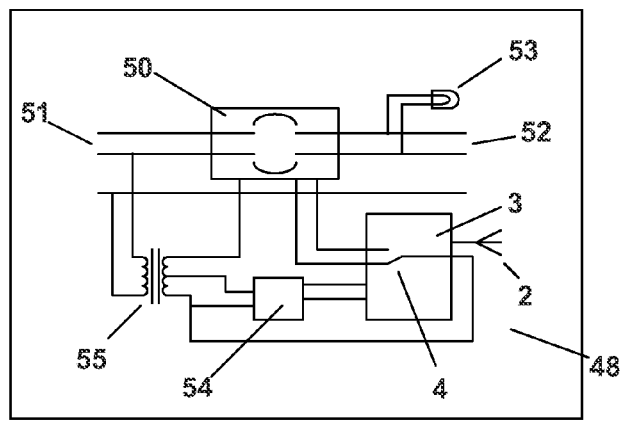
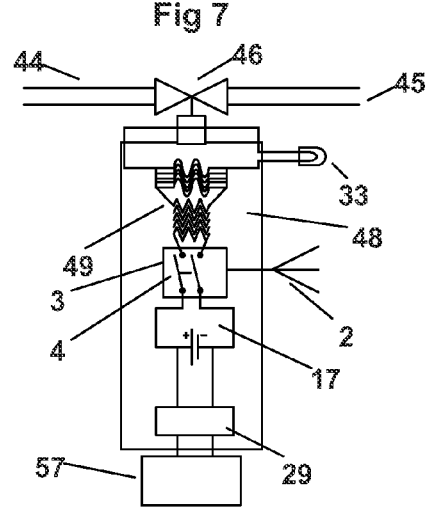
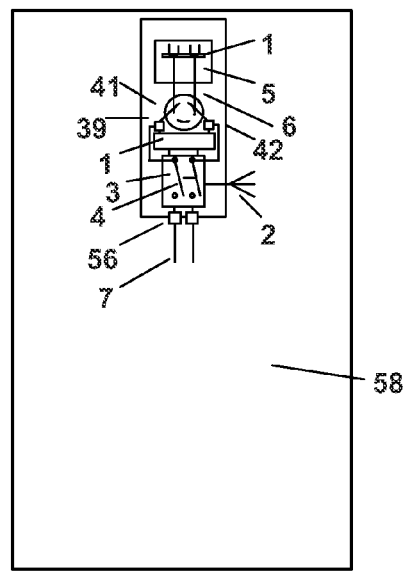

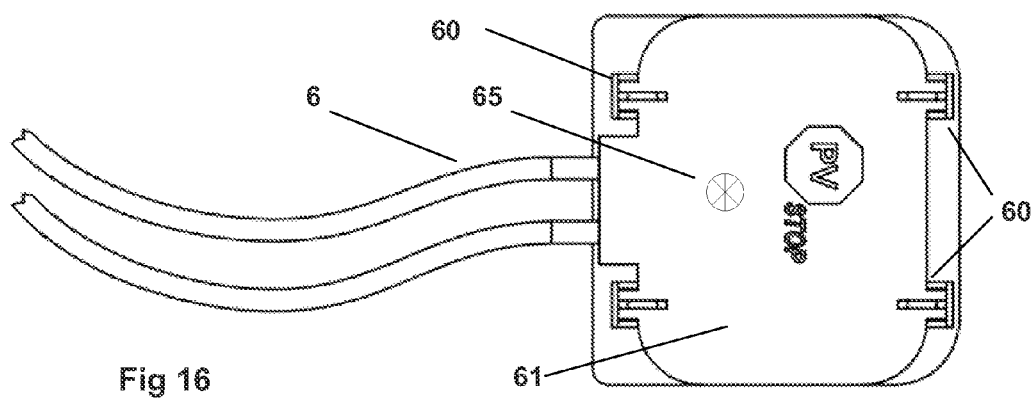
Fig 16
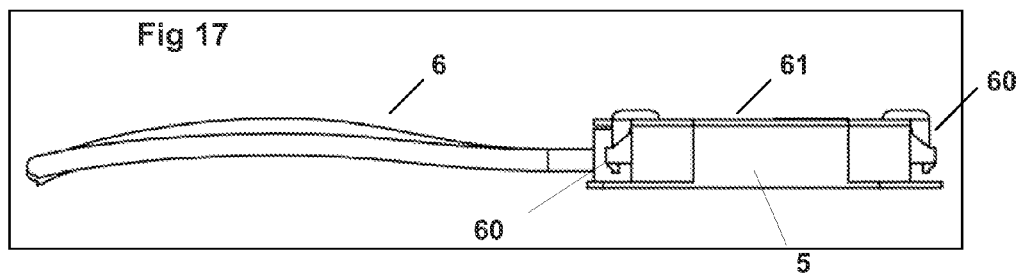
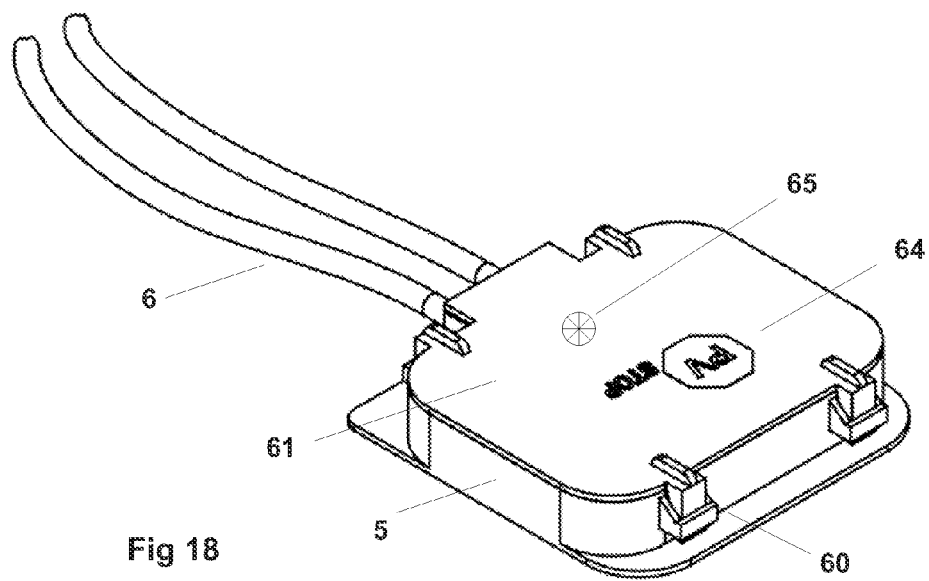
Fig 18

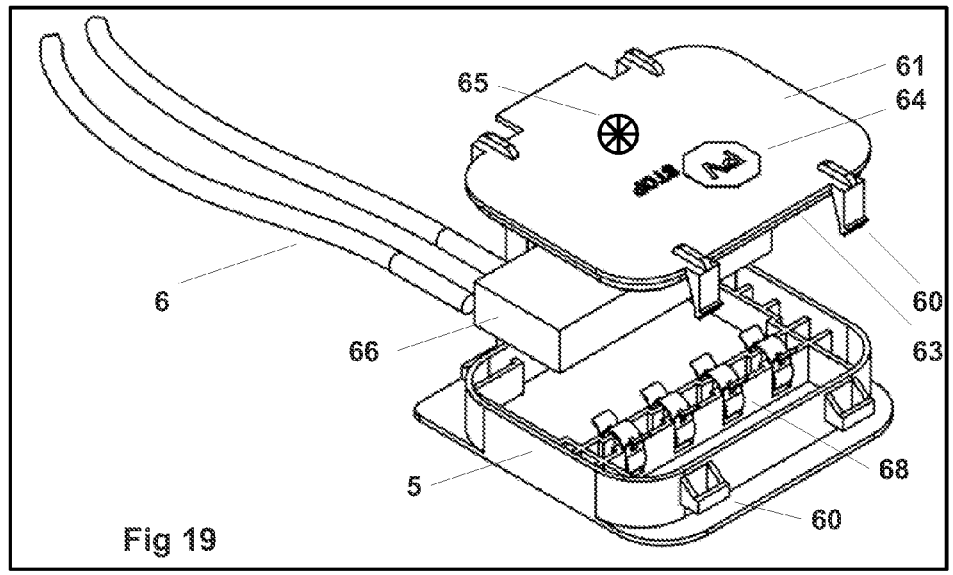
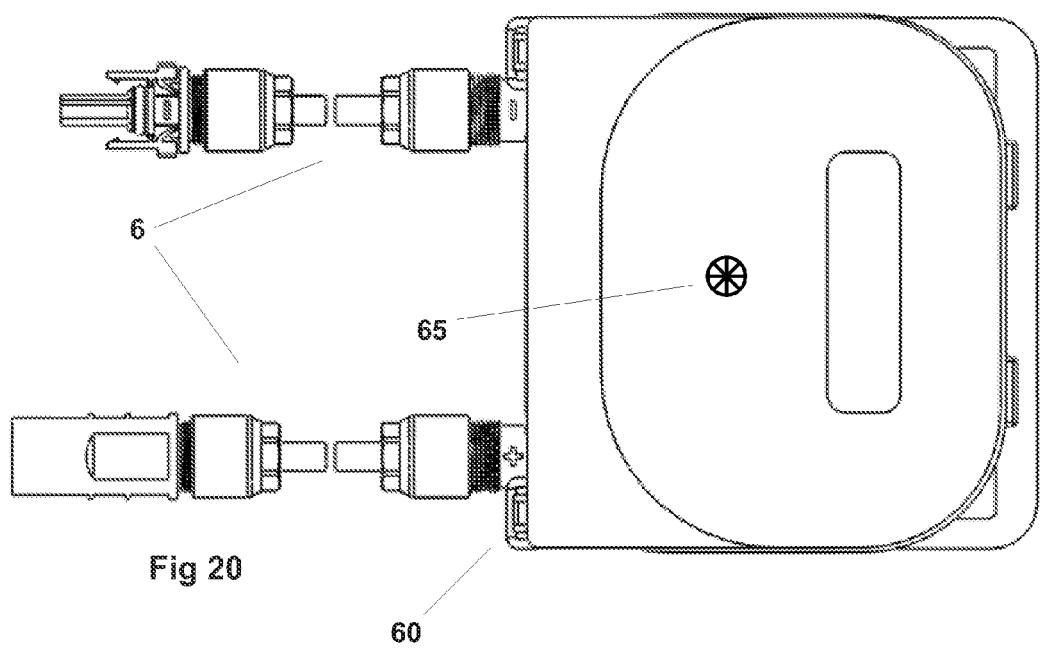

PV STOP POTENTIAL VOLTAGE AND HAZARD STOP SYSTEM

CROSS-REFERENCE TO RELATED APPLICATIONS

This application claims priority to and the benefit of the filing of U.S. Provisional Patent Application Ser. No. 61/778,048, entitled "Solar Pv Safety Switch and Status Indicator System", filed on Mar. 12, 2013, and U.S. Provisional Patent Application Ser. No. 61/819,640, entitled "Pv Stop Potential Voltage and Hazard Stop System", filed on May 5, 2013, and the specifications and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON COMPACT DISC

Not Applicable.

COPYRIGHTED MATERIAL

© Chuck McCune. A portion of the disclosure of this patent document contains material that is subject to copyright protection. The owner has no objection to the facsimile reproduction by anyone of the patent document or the patent disclosure, as it appears in the Patent and Trademark Office patent the or records, but otherwise reserves all copyrights whatsoever.

BACKGROUND OF THE INVENTION

Field of the Invention (Technical Field)

The present invention relates to devices and methods for manually or automatically shutting down supply of power, liquids or gases to buildings or facilities in the cases of emergencies, and for manual or automated shutdown of supplies in other situations.

Background Art

The present invention relates to the Solar PV Panel, Solar electricity industry, Electrical contracting, First Responder Fire/EMS services, Solar PV service technicians and electrical and fire safety, manufacturing, automation, robotic, conveyor system, public or private utility, wind turbine, mechanical contracting, gas, fuel, process piping of air, gas, chemical, any material or any system requiring complete or partial shutdown control for the purpose of mitigating or eliminating any hazard to animal/human/environment health, safety or property. Historically and as renewable energy systems such as wind and solar power become more prevalent, increasingly dangerous conditions exist for first responders to fire and other emergencies. First responders face possibility of electrocution, explosions, hazardous toxic exposure and other threats when responding to emergencies. In the case of solar PV modules on or near a structure, solar panels are electrically energized when exposed to sunlight, any light source including even moonlight. This presents electrocution hazard when fire responders introduce water to attack a fire. An examination of the hazards presenting to first responders and technicians concerning emergencies and repairs it became evident that PV Stop™, the present invention, could mitigate or eliminate many of these hazards presented by solar PV and other charged equipment or systems.

BRIEF SUMMARY OF THE INVENTION

Objects, advantages and novel features, and further scope of applicability of the present invention will be set forth in part in the detailed description to follow, taken in conjunction with the accompanying drawing FIGS. 1-30, and in part will become apparent to those skilled in the art upon examination of the following, or may be learned by practice of the invention. The objects and advantages of the invention may be realized and attained by means of the instrumentalities and combinations particularly pointed out in the appended claims.

The present invention provides a system to interrupt the line or supply side power or charged system of any building, appliance, utilization equipment, fuel burning, process piping system, hazmat, conveyor, robotic, automation, vehicle, material handling, backup battery system, backup generator, moving machine parts hazard, wind generator, or power output of a solar PV or any other solar electrical or heat producing device so as to render the system without charge or current output outside of the junction box/enclosure or equipment load supply connection so that emergency first responders or solar/any technician, authorized personnel in any field, system maintenance crew may avoid electrocution, chemical or machine/appliance hazard in the presence of fire, explosion, structural failure/compromise, moisture, flammables, caustics, hazmat, water stream, mist, fogging, physical damage or servicing of the system. The system can be engaged for any anticipated disaster such as fire, hurricane, tornado, earthquake, flood, etc.

The inventive device comprises a control panel, containing a multiplicity of devices, located and properly marked, presumably in building code approved or fire marshal approved location, or any other appropriate location, in readily recognized area such as at the utility service entrance to premises or a substation area within a facility or any other location to communicate commands to any PV Stop controlled equipment.

In the case of a solar PV or solar concentrating system a Wireless Control Personality Module containing receiver/transceiver switch/relay inside, adjacent, near or in proximity to the junction box/enclosure or immediately at the output leads from any solar PV energy source which is activated from a remote or on-site location relative to the solar electrical producing device through a combination of any transmitter/transceiver and any receiver/transceiver, through command protocols generated by Arduino, Raspberry Pi or other similarly capable micro controller platform, wired, wireless, Bluetooth, RF, IR, WiFi, voice command, WAN, LAN, smart phone, GSM, CMDA, tablet, computer or any other signal, direct signal or electrical connection which either locks the switch on or off, connected through or directly to the PV STOP POTENTIAL VOLTAGE AND HAZARD STOP SYSTEM main control panel. A visible and/or audible indicator allows for the first responder or system maintenance crew to have definitive feedback at the PV Stop main control panel, as to the off or on status or power output of the controlled system. In the off position the relay/switch renders the load side leads or electrical wiring from the solar electrical device or any other device controlled by PV STOP, dead or un-charged. A Lockout code sequence and/or mechanical lockout device mechanism is required to re-energize any potential hazard controlled by the PV Stop system subsequent to remedy of the hazard event conditions.

BRIEF DESCRIPTION OF THE SEVERAL VIEWS OF THE DRAWINGS

The accompanying drawings FIGS. 1-30 in the attachment, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

1. Terminal Block in solar junction box
2. Antennae
3. Receiver/Transceiver
4. Single Throw—Double Pole Relay/Switch (or multiplicity of poles and/or throw) either normally open or normally closed,
5. Solar PV MF Junction Box (MF—Multi Function) Panel or Enclosure
6. Junction Box Leads
7. Conductors to next PV unit or to Inverter
8. Relay Coil
9. Solar PV BusBar Tabs
10. Speaker/Annunciator
11. Red LED Indicator Light
12. Green LED indicator Light for Utility Grid or any line supply voltage
13. OFF Switch
14. On Switch
15. LCD LED or other Voltage Status Display Panel (Readout)
16. Printed Circuit Board w/ Arduino, Raspberry Pi or similar platform
17. Backup Battery
18. Remote Transmitter
19. Remote Signal (RF)
20. On Button
21. Off Button
22. Indicator Light
23. 110 v (or any voltage) Power In to Power Supply and to Charge Backup Battery
24. PV STOP Weather Proof Enclosure Controller Panel
25. Transformer
26. 12 VDC Power Supply
27. 6 Pole Single Throw Switch (or any number poles or throw or relay)
28. Main Printed Board (with Arduino, Raspberry Pi, terminals etc.)
29. 12 Volt Regulator (or any voltage)
30. Wireless Transmitter/Transceiver to Gas and/or Liquid and/or Material
31. Wireless Transmitter/Transceiver to PV Module and/or Any Power Supply or Source
32. Wireless Transmitter/Transceiver to Utility/Grid and/or any Power Supply or source for breaker interrupt of any load usage on any utilization equipment or building load.
33. LED indicator light for Gas and/or Liquid and/or Material
34. Hard wire power to Gas and/or Liquid and/or Material
35. Inputs/Outputs to Communicator RJ11, RJ45, Coaxial, Fiber Optics etc or any other means
36. Still and/or Video Camera—Local or off site streaming via POE or any power source
37. PV module On Indicator light
38. Communication Module Incoming or outgoing fire, status, internet, broadband fiber optic, coaxial, any hard wire or any wireless signal.
39. Retro-Fit WP MF J-Box Enclosure Panel
40. PV Module
41. Manufacturer Factory Lead Spool
42. Y-Connector
43. Power from PV Stop Device
44. Gas and/or Liquid and/or Material Supply Source
45. To Gas and/or Liquid and/or Material Utilization Equipment
46. Seismic Actuated Valve
47. Solenoid Valve or other Actuated Valve w/ mechanical lock out
48. WP Enclosure for Remote Valve/Power Equipment Controls
49. Seismic Simulator (Vibrator)
50. Circuit Breaker (Remote Controlled Multi-Pole Breaker as required)
51. From Power Source (Utility Grid or any Source)
52. Power Load To Meter or Utilization Equipment
53. Power/Grid On Indicator Light
54. 12 VDC Power Supply
55. Transformer
56. Lead Connectors
57. Mini (or any sized for load) Solar PV Module Power Supply for Remote Receiver/Transceiver and Battery Power Supply
58. Standard Solar PV Module or any solar PV module w/ Retrofit-Box
59. Flexible Leads w/ terminals for solar bus tabs
60. Snap in or friction projection and detent retention or equivalent fastener clip system
61. J-Box Cover
62. Retrofit MF J-Box Enclosure. Sleeve extension
63. Seal
64. Logo—in this depiction for PV Stop trademark
65. Liquid tight Vapor transport, 2 way liquid moisture exclusion device
66. Wireless Control Personality Module
67. Diodes Only Personality Module
68. Pressure Clips or Tab Terminals
69. MF J-Box Adapter Plate
70. Diodes
71. BusBar Tabs to Solar PV MF Junction Box (MF—Multi Function) Panel or Enclosure to Leads Circuit
72. MF J-Box Printed Circuit Board
73. Relay
74. MCU—Micro Controller
75. Transceiver
76. Peripherals Module—relays, switches, sensors, keypad/input
77. USB Storage
78. Auxiliary Input/Output (I/O)
79. Fire Alarm System
80. Shutdown Relay Contact
81. Solar Module Outside range of 24 Control Panel
82. Range for Wireless Communication with Remote Devices
83. Signal from Control Panel 24
84. Signal from In-Range Transmitter/Transceiver to Out of Range Equipment or PV Module 81

Figure 11:
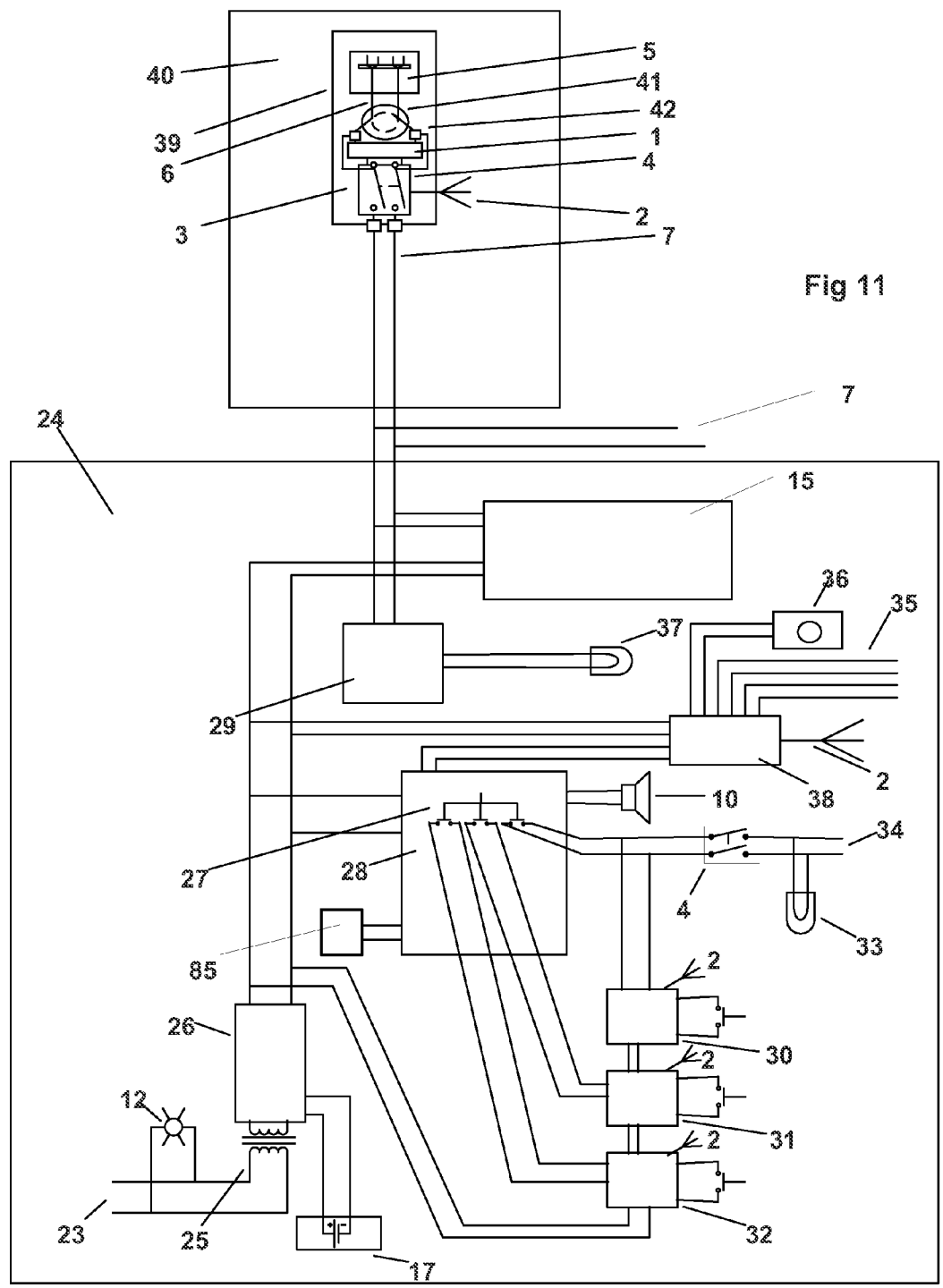

85. Keypad/Touch Screen or other similarly capable input device to key in commands, communications, programming, security codes.
86. Wind Turbine
87. Backup Battery or Battery System
88. Backup or Auxiliary Generator
89. Materials Conveyor
90. Motorized Equipment
91. Material Handling (or any) Vehicle
92. Process Piping (liquid or gas)

FIG. 1 is a schematic drawing of a solar PV MF junction box 5 containing a receiver/transceiver 3, receiving signal through antenna 2 connected to the solar busbar tabs terminal block and a single throw double pole relay 4 and powered by a relay coil 8 to operate the relay 4 through the power produced by the solar PV module, to effect positive disconnect of the junction box leads 6.

FIG. 2 is an interface panel within a weather proof enclosure control panel 24 containing a speaker/annunciator 10, on and off (green and red) indicator lights 11 12, on and off manual switches (green and red) 13 14, a keyboard interface 85 and an LCD display panel 15.

FIG. 3 is a side view 24 cutaway section of FIG. 2.

FIG. 4 is a remote transmitter 18, in this case an RF transmitter with indicator light 22, green on button 20 and red off button 21, sending signal 19 to the equipment controlled by the PV Stop System.

FIG. 5 is a schematic of printed circuit board 16 depicting 2 switches 13 14, antennae 2, speaker/annunciator 10, backup battery 17, LED indicator lights 11 12, input interface keypad/touchscreen 85, display 15, power feed from Line In 23, and connected to the switched conductors 7.

FIG. 6 is a schematic of a remote controlled valve or shutoff device 47, within a weather proof enclosure 48, depicting a power feed 43 of any voltage, in this case 12 VDC, supplying a receiver/transceiver 3, interrupted via relay 4, when actuated, shuts off the valve or shutoff device 47 and indicator light 33, providing shutoff control between the supply 44 and the building or utilization equipment delivery 45.

FIG. 7 is a schematic similar to FIG. 6 with the additional capability of being affixed to a seismic valve or shutoff device 46, between the supply 44 and the building or utilization equipment delivery 45, within a weather proof enclosure 48, whereby the relay 4, actuates the Seismic Simulator 49, to simulate earthquake. Power is supplied by a backup battery 17, which is charged through voltage regulator 29 by a solar PV panel 57, sized for the load required. Signal is received by antenna 2, in receiver/transceiver 3, receiving in this case RF signal 19 from main control panel 24. The transmitter/transceiver 3 can transmit valve status back to any device in PV STOP base unit 24.

FIG. 8 is a schematic similar to FIG. 6 with wireless actuation capability, receiver/transceiver 3 affixed with antenna 2, receiving in this case RF signal 19, within a weather proof enclosure 48, whereby the relay 4, actuates the Valve or shutoff device 47. Power is supplied by a backup battery 17, which is charged by a solar PV panel 57 through voltage regulator 29, sized for the load required. The transmitter/transceiver 3 can transmit valve status back to any device in PV STOP base unit 24.

FIG. 9 is a schematic of a shutoff device depicting the capability of interrupting any power source of any voltage or phase configuration. FIG. 9 depicts a single phase system supplied by source 51, configured with circuit breaker 50, which can be actuated by remote signal received by antenna 2, on receiver/transceiver 3 from control Panel 24 depicted in FIG. 11. The device depicted in FIG. 9 receives power from line voltage 51, conditioned by transformer 55, to a power supply 54 depicted here as 12 VDC, supplying power to remote receiver/transceiver 3, receiving in this case RF signal 19 to activate relay switch 4. A power indicator light 53 is located on the load side of the circuit breaker 50 to indicate power on or off status to persons in need of positive system status feedback.

FIG. 10 is a schematic of a remote shut off device containing a multiplicity of electronic devices and connectors enclosed in a waterproof enclosure 39 that fits over a standard PV solar module MF J-box or enclosure 5, in a standard, non-standard or any Solar PV module 58, providing a lead spool 41, allowing for factory Module leads 6 to be wound up and gathered with the ends terminating in a Y connector 42, feeding power to terminal block 1 and receiver/transceiver 3, receiving in this embodiment RF signal 19 through antenna 2 to activate relay switch 4. Power under normal conditions is fed from Relay 4 to lead connectors 56 into standard manufacturer leads 7 to next module in array or to inverter. Waterproof Retrofit Enclosure 39 is fitted with a water tight access cover (not shown).

FIG. 11 is a schematic of an embodiment expanding the capabilities depicted in FIGS. 1-5 of the main PV STOP— POTENTIAL VOLTAGE AND HAZARD STOP SYSTEM panel enclosure 24 with a multiplicity of electronic devices, connectors, communication modules, transmitters, receivers/transceivers, and mechanical devices. Power for the system 23, with connected power indicator light 12, feeds transformer 25, supplying conditioned power to power supply 26, thus feeding power to transmitters/transceivers 30 31 32, or more not shown, and supplying power to Main Printed Board 28, communication module 38, PV module voltage status display readout 15, and/or a multiplicity of voltage displays 15 (not shown). The main controller PB 28 is equipped with a mechanical or electronic switch 27 of any number of poles, (in this depiction six pole) which actuates all of the connected transmitters/transceivers 30 31 32, and direct transmitted connection to relay 4, an embodiment of remote personality module (or more not shown). Main PB controller 28 is equipped with a speaker 10 or other sound communication for positive system status feedback. Remote Receiver/transceiver 3 signals relay 4 in remote enclosure 48 and connected to indicator light 33 for positive status feedback on any system/equipment/appliance controlled by transmitter/transceiver 30 or relay 4 on load line 34. Each transmitter/transceiver 30 31 32 or more is fitted with its own individual switch 13 14 for isolated control of remote Personality modules from the rest of the system. Communication module 38 is fitted with input/output to fire alarm systems, keypad/touchscreen input 85, hard wired 35 or through any wireless signal through antenna 2, to equipment manufacturers/monitoring, owner, any need-to-know personnel, first responder, still/video camera 36 either/or archived (remote or local) and/or streaming live, and capable of two way communication to and from main system controller PB 28 to actuate any transmitter/transceiver, switch, relay, signal communication embodied within PV STOP, POTENTIAL VOLTAGE AND HAZARD STOP SYSTEM panel enclosure 24. Voltage regulator 29 is fitted with PV Module Status light 37 either wired as shown or wireless, for positive system voltage status feedback. Multiple PV STOP, POTENTIAL VOLTAGE AND HAZARD STOP SYSTEMS embodied within Enclosure 24 can be installed at multiple locations on site and daisy-chained via hard wire or wireless signal through communication modules 38 thereby providing safety protection and scene control for large expansive facilities with no distance or layout configuration limitations. A transmitter/transceiver 3 can communicate to any remote wireless control device location such as depicted hi FIG. 7 and can transmit status back to any device in via transceiver/receiver 30 31 32 in PV STOP base unit 24.

Figure 12:
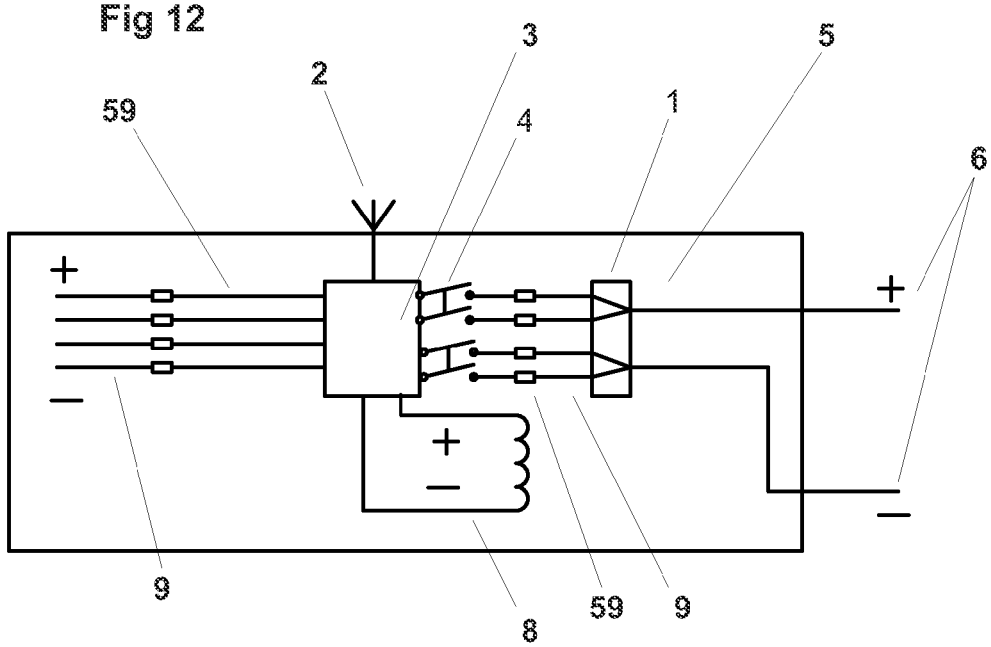

FIG. 12 is a schematic embodiment of a PV module MF J-Box or enclosure 5 where by the PV solar busbar tabs 9, are severed and reconnected through Flexible Leads w/ terminals 59, connected to receiver/transceiver 3, receiving signal through antenna 2 to be switched by relay 4, fitted with flexible leads w/ terminals 59, connected to remaining downstream busbar tabs 9 into PV j-box terminal bar 1, feeding j-box leads 6. Power to receiver/transceiver 3 and relay 4 is provided by power from PV solar busbars 9. Relay 4 is operated through relay coil 8.

Figure 13:
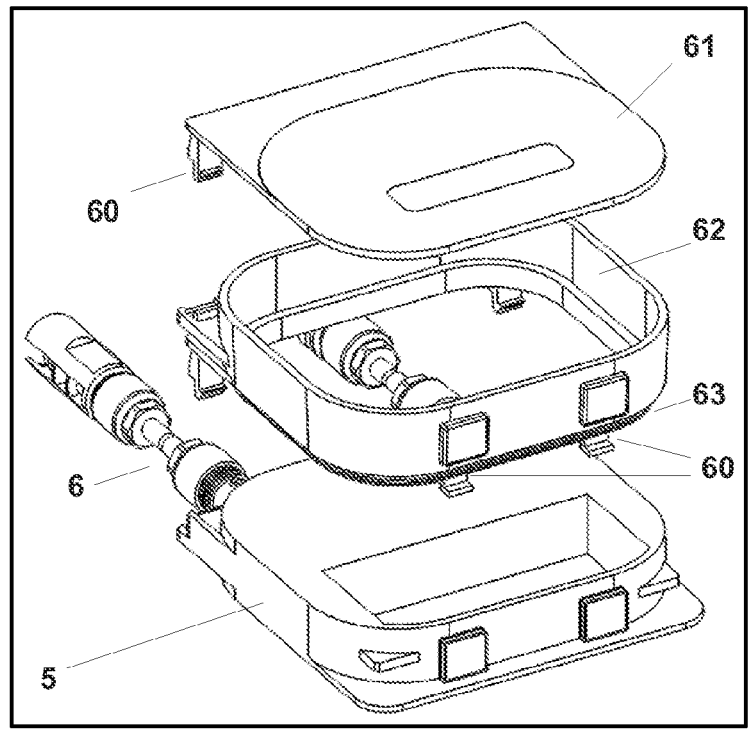
Figure 25:
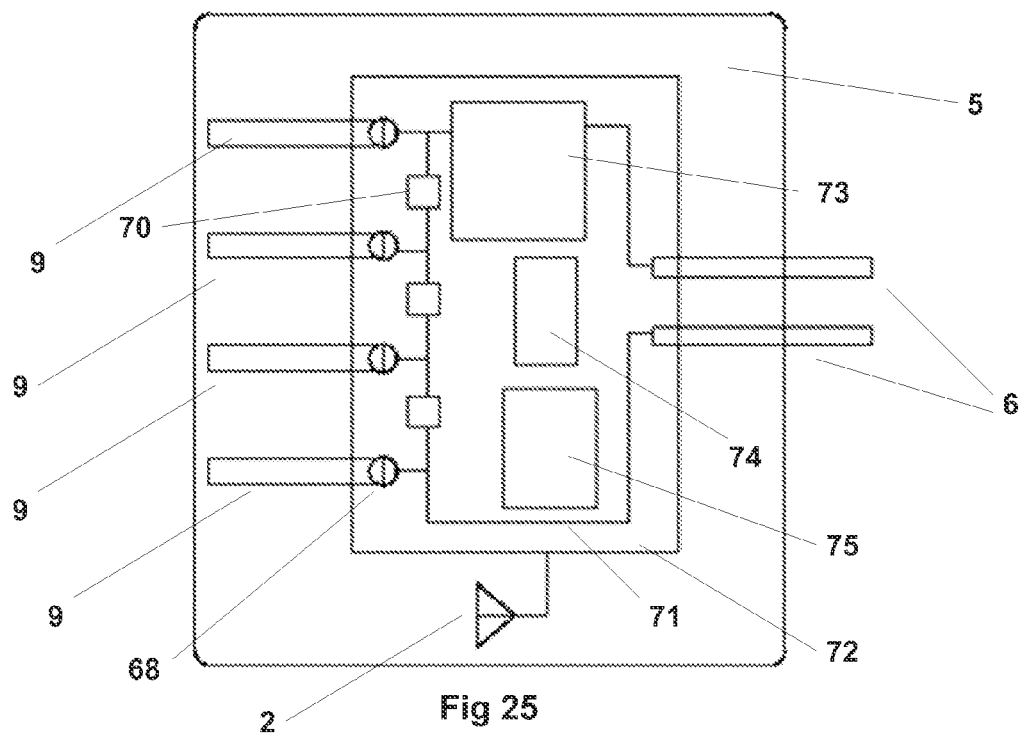

FIG. 13 is an exploded view of a factory J-box or enclosure 5 with factory leads 6. The factory J-box or enclosure cover 61 is removed from j-box enclosure 5. A Retrofit MF J-Box or Enclosure Sleeve extension 62, configured with seal 63 and Snap in or friction projection and detent retention clip system 60, is positioned to snap onto j-box or enclosure 5 and provides space for receiver/transceiver 3, Relay switch 4, antenna 2, relay coil 8, and the PV solar busbar tabs 9 and flexible leads 59 which all comprise what is depicted in FIG. 25 and as a Wireless Control Personality Module 66 in FIG. 19. Cover 61 is then fitted to closure on Sleeve Extension 62.

Figure 14:
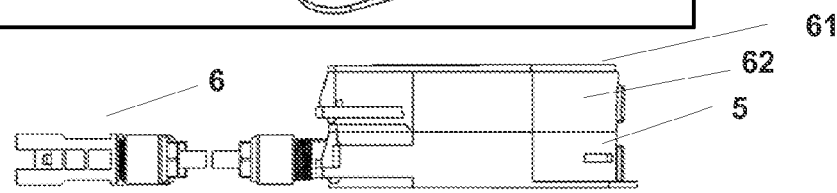

FIG. 14 is a side elevation view of FIG. 13, depicting J-box or enclosure 5 with leads 6, fitted with Retrofit J-Box/Enclosure Sleeve extension 62 and j-box enclosure cover 61.

Figure 15:
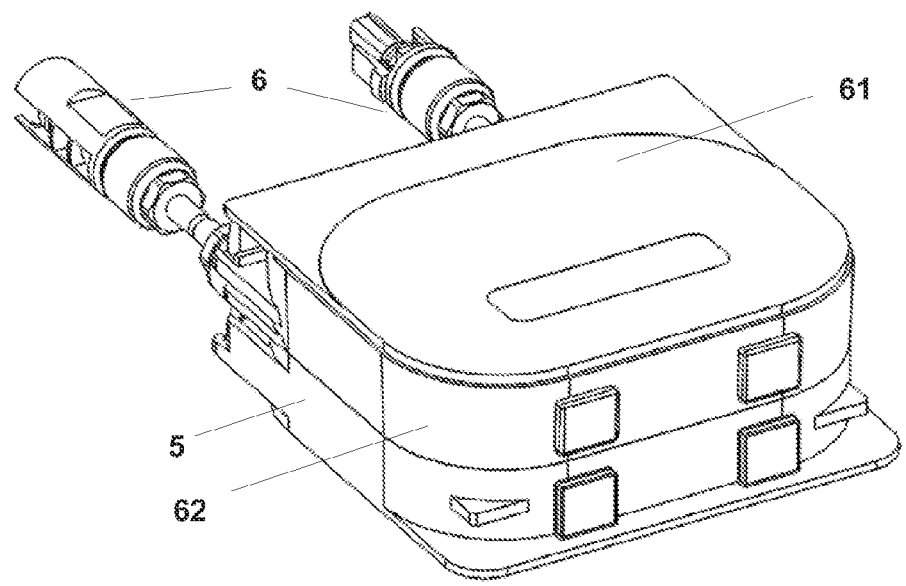

FIG. 15 is an assembled view of FIGS. 13 and 14, showing J-box or enclosure 5 with j-box leads 6, Retrofit MF J-Box Sleeve extension 62, and fitted with j-box/enclosure cover 61.

FIG. 16 is a top view of a preferred embodiment of PV Stop J-box or enclosure assembly depicting j-box/enclosure cover 61, Snap in or friction projection and detent retention clip system 60, Liquid tight Vapor transport, 2 way liquid moisture exclusion device 65, and j-box leads 6.

FIG. 17 is an side elevation view of FIG. 16 depicting J-box or enclosure 5, J-box leads 6, Snap in or friction projection and detent retention clip system 60, j-box/enclosure cover 61, and j-box leads 6.

FIG. 18 is a 3-d perspective view of FIGS. 16 and 17 depicting the assembly of a PV Stop J-box or enclosure 5, with PV Stop logo 64, Liquid tight Vapor transport, 2 way liquid moisture exclusion device 65, Snap in or friction projection and detent retention clip system 60, j-box/enclosure cover 61, and j-box leads 6.

FIG. 19 is an exploded view of a preferred embodiment of the PV Stop MF J-box or enclosure 5 with J-box leads 6, assembly depicting Snap in or friction projection and detent retention clip system 60, j-box/enclosure cover 61, Seal 63, PV Stop Logo 64, Liquid tight Vapor transport, 2 way liquid moisture exclusion device 65, Wireless Control Personality Module 66 (interchangeable with Diodes Only Personality Module 67 not shown), and Pressure Clips or Tab Terminals 68.

FIG. 20 is a top view of FIG. 19 J-box or enclosure 5 assembly showing j-box leads 6, Snap in or friction projection and detent retention clip system 60, and Liquid tight Vapor transport, 2 way liquid moisture exclusion device 65.

Figure 21:
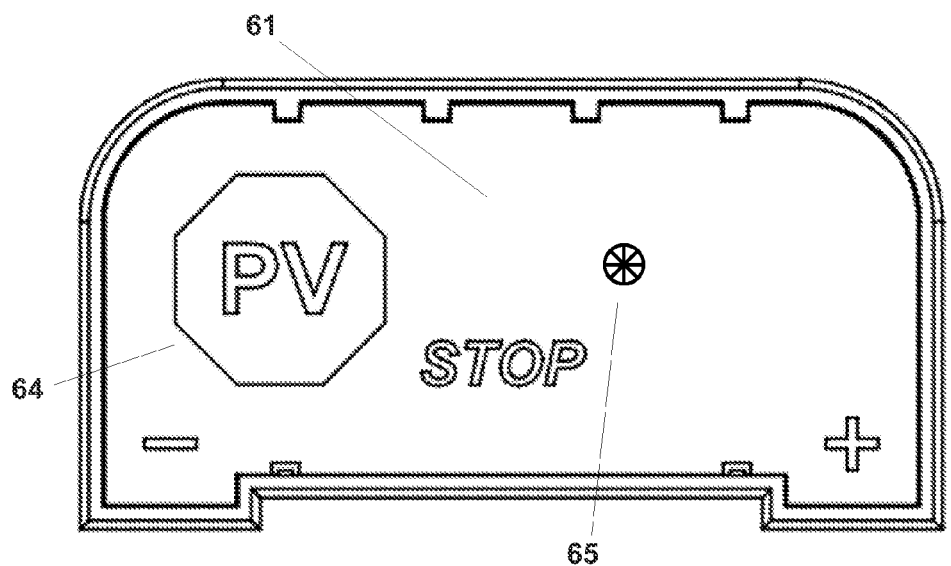
Figure 22:
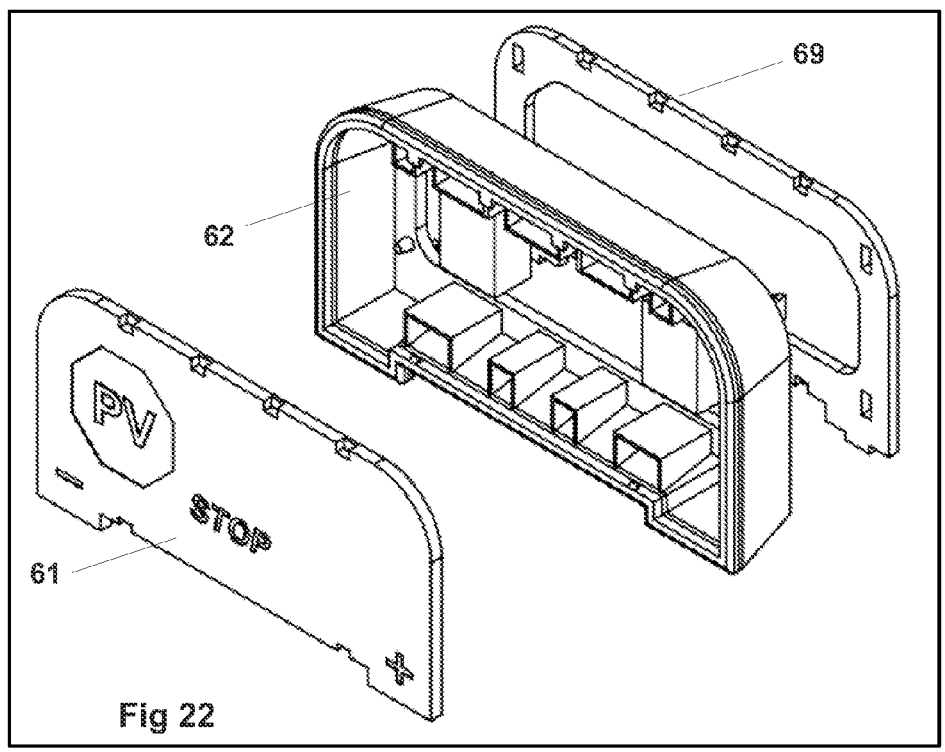

FIG. 21 is a top view of a possible embodiment for a retrofit J-box or enclosure sleeve 62 assembly providing a space and location for a personality module to snap over an existing manufacturers j-box or enclosure 5 as shown in the exploded view FIG. 22 thus enabling PV Stop upgrades to existing manufacturers PV module's J-box or enclosure.

FIG. 22 is an exploded 3-d view of a possible embodiment for a retrofit J-box or enclosure sleeve 62 assembly providing a space and location for a personality module 66 or 67 (not shown) to snap over an existing manufacturers j-box or enclosure 5, fitted with a j-box/enclosure cover 61, and J-Box or enclosure Adapter Plate 69.

Figure 23:
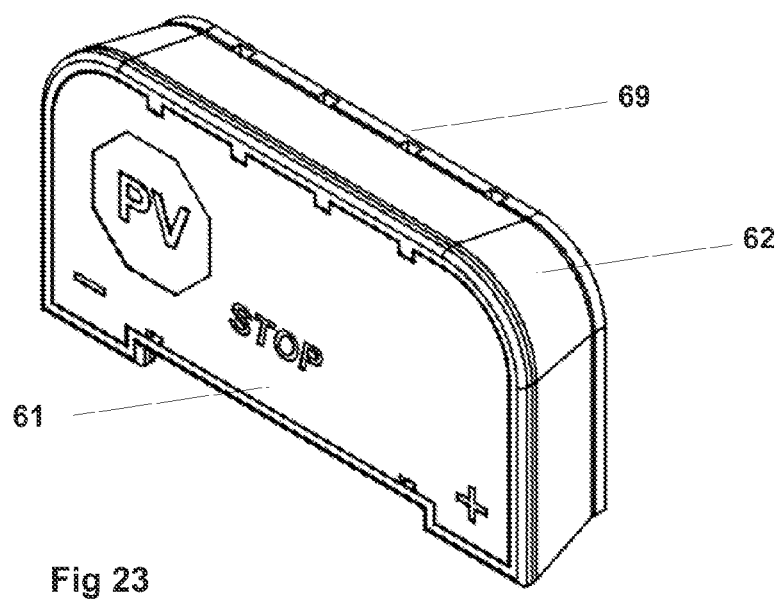

FIG. 23 is a 3-d view of a possible embodiment for a retrofit J-box or enclosure sleeve 62 assembly providing a space and location for a personality module 66 or 67 (not shown) to snap over an existing manufacturers j-box or enclosure 5, fitted with a j-box/enclosure cover 61, and J-Box/enclosure Adapter Plate 69.

Figure 24:
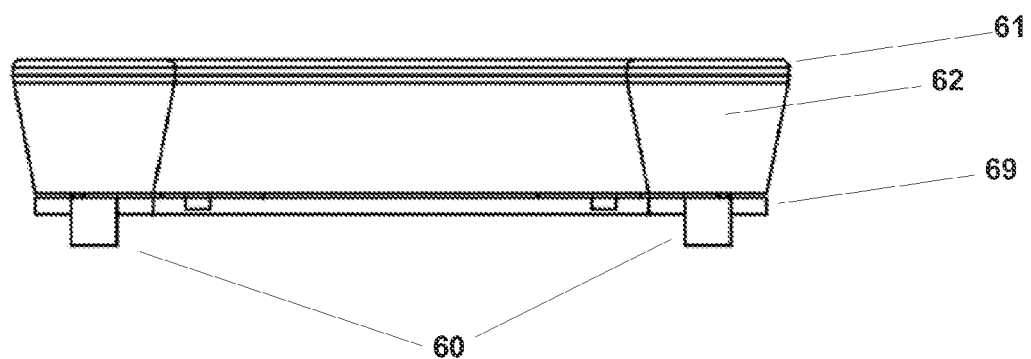

FIG. 24 is an elevation view of assembly depicted in FIG. 23 showing Snap in or friction projection and detent retention clip system 60, a j-box/enclosure cover 61, a retrofit J-box or enclosure sleeve 62, and J-Box/enclosure Adapter Plate 69.

FIG. 25 is a schematic preferred embodiment of a Wireless Control Personality Module 66, within a PV j-box or enclosure 5, depicting the possible arrangement of solar PV busbar tabs 9, connecting to terminals 68, diodes 70, circuit 71, connected to j-box leads 6, on a printed circuit board 72 fitted with antenna 2, having located upon circuit board 72, a Relay 73, MCU—Micro Controller 74 and Transceiver 75.

Figure 26:
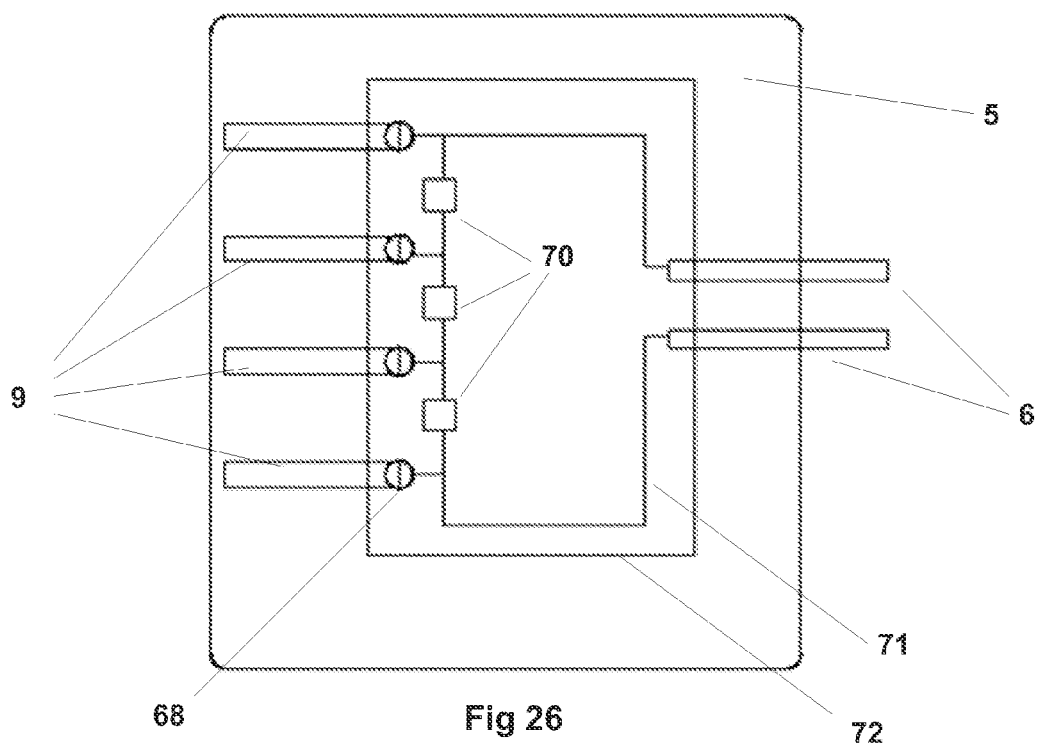

FIG. 26 is a schematic preferred embodiment of a Diodes Only Personality Module 67, within a PV j-box or enclosure 5, depicting the possible arrangement of solar PV busbar tabs 9, connecting to terminals 68, diodes 70, circuit 71, on PCB 72, connected to j-box leads 6, functionally providing a simple jumper module between PV busbars 9, through diodes 70, and circuit 71, to the PV j-box leads 6.

Figure 27:
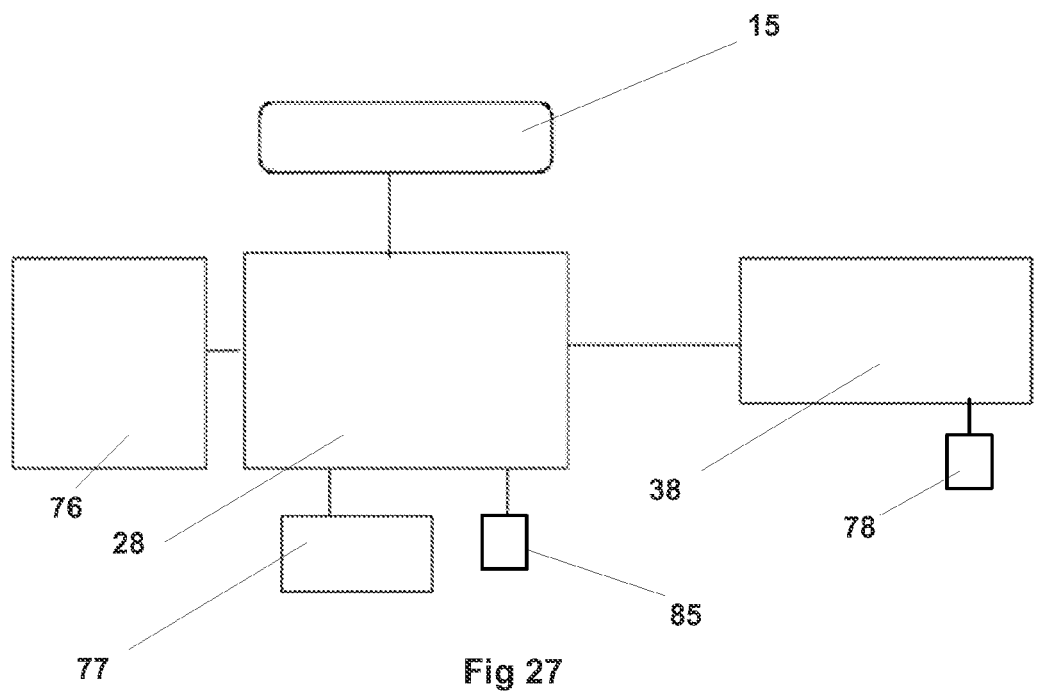

FIG. 27 is a preferred embodiment schematic block diagram depicting an LCD display 15, connected to a main control Printed Circuit Board (or processor board) 28, with an external peripherals module 76, a USB storage module 77, a keypad/touchscreen input device 85, and a Communications Module 38 and Aux I/O 78.

Figure 28:
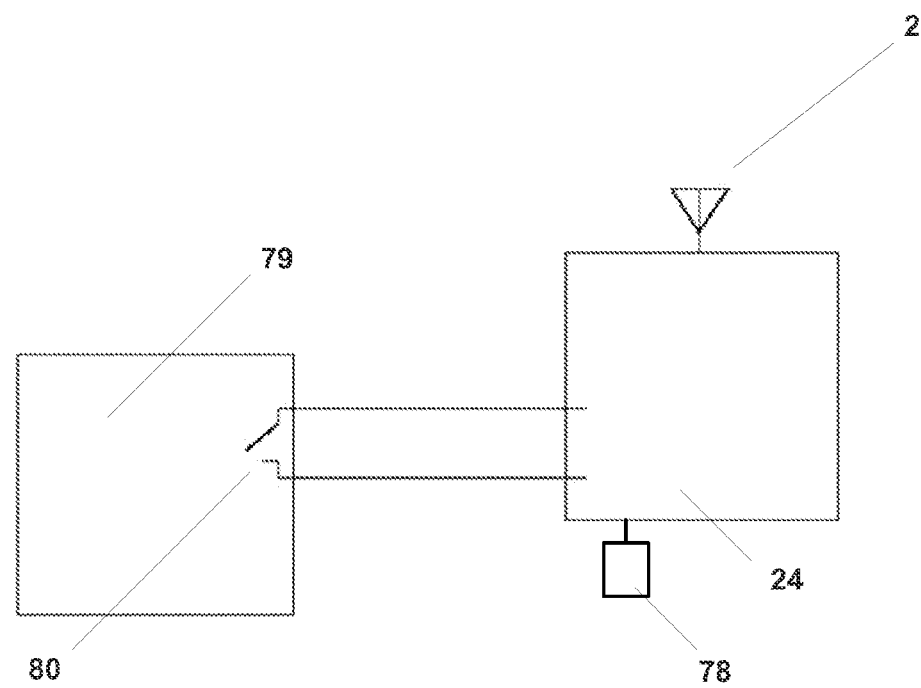

FIG. 28 is a schematic block diagram showing relationship between Fire Alarm System 79 with Shutdown Relay Contact 80, and the Main PV Stop Control Panel 24, fitted with antenna 2 and Aux I/O 78.

Figure 29:
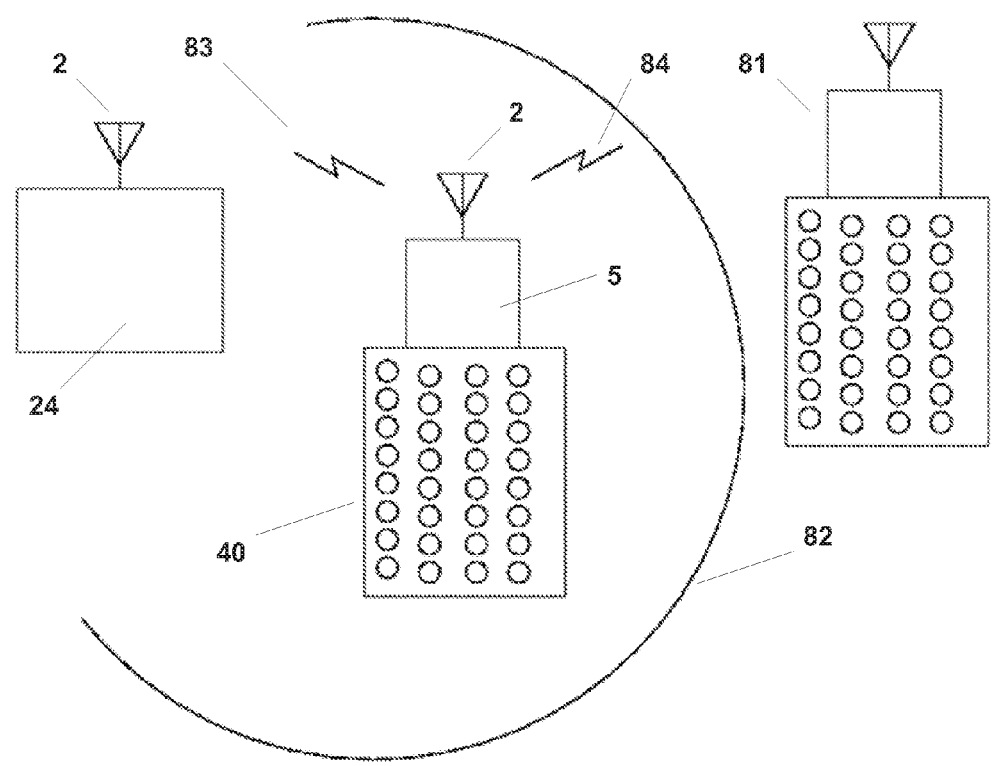

FIG. 29 is a schematic block diagram showing a relationship in terms of range 82, from the Main PV Stop Control Panel 24 with antenna 2, sending signal 83 to (receiver/transceiver 3 not shown), in J-box or enclosure 5 fitted with antenna 2 on PV module 40, which then sends signal 84 to Out of Range PV module 81 demonstrative of a daisy chain capability of the PV Stop System.

Figure 30:
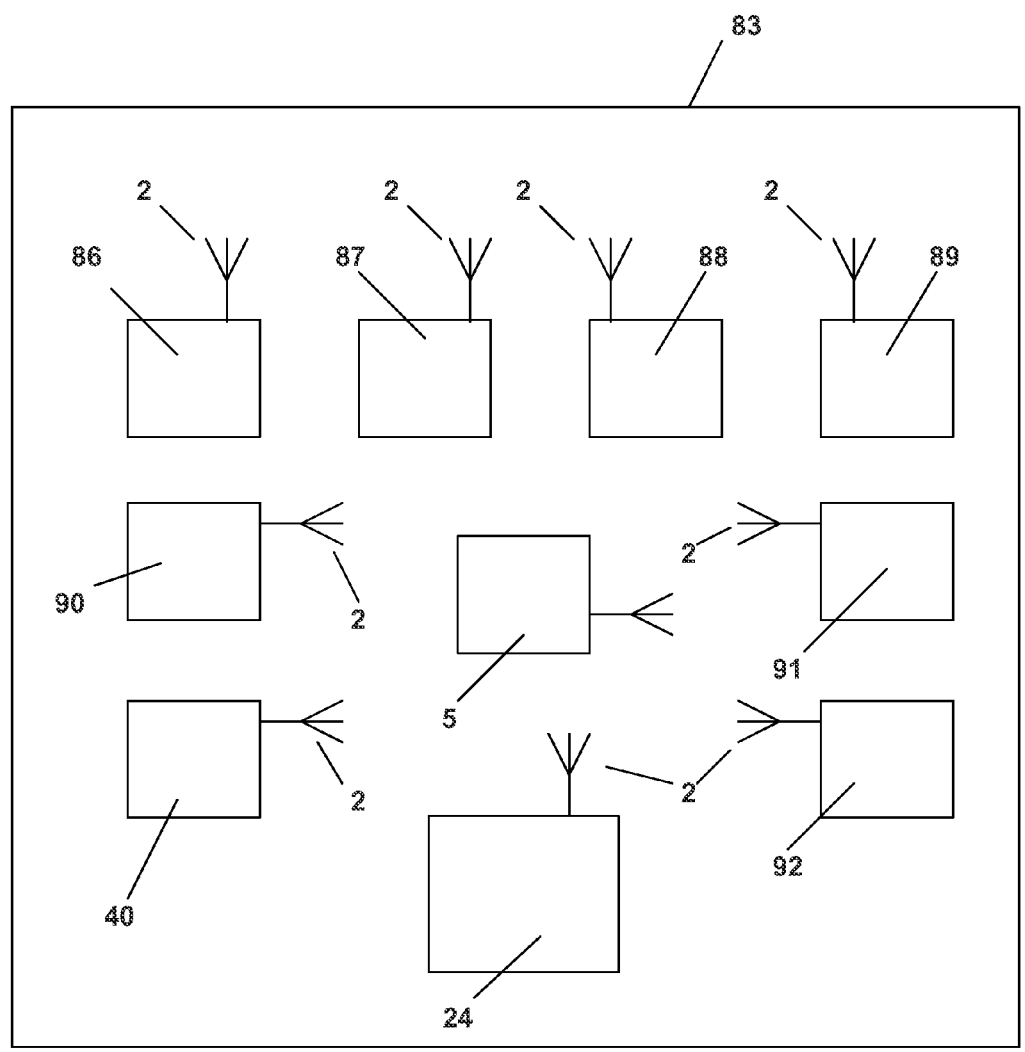

FIG. 30 is a schematic block diagram showing a relationship to demonstrate the capability of the PV Stop system to communicate between Main Control Panel 24, either directly or through Junction/Enclosure 5 fitted with Antenna 2, containing a wireless or wired personality module, to control via wireless signal, the on/off status of Wind Turbine 86, Backup Battery or Battery System 87, Backup or Auxiliary Generator 88, Materials Conveyor 89, Motorized Equipment 90, Material Handling (or any) Vehicle 91, Process Piping (liquid or gas) 92, or any other potential hazard connected via wired or wireless communication with the PV Stop System.

DETAILED DESCRIPTION OF THE INVENTION

As depicted in FIG. 1-30, power from the solar PV module(s) or other source comes into the junction box/ enclosure 5, connects to terminal block 1, then feeds the receiver 3, which operates relay 4 to feed or interrupt power to junction box leads 6, power then conducted to next PV module or the inverter, and also feeding the printed circuit board/microprocessor board in Main Control Panel enclosure 24. The preferred embodiment would be the devices contained within a Wireless Controlled Personality Module within junction box/enclosure 5 as depicted in FIG. 19 to be installed on each and every solar PV power source (panel) in the system. The objective is to positively shut off all power emanating from the junction box/enclosure 5 into the junction box leads 6 so that first responders, emergency and solar maintenance workers can be safe from electric shock or electrocution. This switching/relay system could be utilized for any power source, back up generation, co-generation, electric utility system, wind generator, etc.

The invention is further described in the documents attached hereto, PV STOP—POTENTIAL VOLTAGE AND HAZARD STOP SYSTEM Drawings pages 1 through 13, FIGS. 1-30. While the preferred embodiment of the invention includes application directed to the Solar PV industry and trades, the invention is designed to interrupt any power, energy, gas, fuel, chemical or material source for the safety of workers and emergency first responders including but not limited to any electrically powered tool or system, backup power generation, co-generation systems, wind turbine systems, process piping system, hazmat material delivery system, conveyor of any type, material handling, vehicle, stored energy system, moving machine parts, robotics, automation or any other potential mechanical, electrical, chemical, gas or fuel delivery system, to provide a definitive and fail safe complete shutdown of all electrically charged parts in an electric power system and/or remove any potential supply or machine/appliance hazard controlled by the PV STOP system, as described herein, or of any sort, with verifiable visual and/or audible system status feedback.

INDUSTRIAL, RESIDENTIAL AND COMMERCIAL APPLICABILITY

The invention is further illustrated by the following non-limiting examples.

Example 1

This PV STOP—POTENTIAL VOLTAGE AND HAZARD STOP SYSTEM can be used to control a single PV power source, multiple PV module power sources, a backup generator system, a battery backup power system, a wind turbine power generator, and an electrical energy source of any type to render the entire system off for the safety of workers and emergency first responders. A mock up was made to disable and re-energize a single PV panel with a backup battery system and it was 100% effective in completely interrupting all power output from the PV electric power source rendering all downstream devices, receptacles, outputs, usb, 12 v 110 v and all other electrically connected parts off or disabled. It was then able to reconnect all simultaneously.

Example 2

As depicted in FIG. 1-30, the PV STOP—Potential Voltage and Hazard Stop System incorporating a multiplicity Micro Processor Control Boards, Switches, Relays, Transmitters. Transceivers, Receivers, Batteries, circuits, Transformers, Communicators, Displays, Annunciators, Indicator Lights, Voltage Regulators, Relays, Antennas, can be used to control any Electrical Power Source, any Hazardous Material Delivery system, any gas or liquid fuel delivery system, any process piping or delivery system, or any other charged system supplying any utilization equipment/machinery including but not limited to conveyor systems, vehicles, robotics, automated production lines, fuel burning appliances/equipment, or any other system or equipment, to render all in a safe state of shutdown for the purpose of allowing first responders, emergency workers and authorized personnel to take complete control of all potential hazards that could escalate or contribute to the dangers of the scene and remove the necessity for other personnel (who may be absent, injured or otherwise unavailable), or those with specific site/equipment knowledge to be called to action. First responders need not know the locations or any safety stop, lock out or any other switching, relays, controllers or valves on site. They need only to actuate the one or more shut-off mechanism in PV STOP Main Controller Panel device to render all or some systems off, either by physical switch, relay, remote call in, computer access online, wirelessly, via Bluetooth, smart phone, RF, WIFI, or any other means of communication to the PV and Hazard Stop Device. PV Stop Potential Voltage and Hazard Stop System includes capability to shut off the Electric Utility Supply to the premises at the point of service drop, drip loop, on utility pole, on ground at transformer, at service entrance or anywhere on site. PV Stop Potential Voltage and Hazard Stop System Devices can be utilized to shut off any backup generator, wind turbine, Battery Backup, Gas or Fuel valve and/or delivery system charged with any electric, air, gas, fuel, material conveyance, process piping of hazardous materials/chemicals etc. Vehicles/forklifts/cranes and other material handling equipment can be outfitted with receivers to shut down so that operator does not inadvertently enter a hazardous area where first responders are on scene and have actuated the PV and Hazard Stop System to effect scene safety. The Main Control Panel includes capability to disconnect all, some, or a sequence of PV Stop controlled equipment. Fire, first responder or technician personnel having the complete control of any potential hazard controlled by PV Stop. Security for preventing unauthorized access to the PV Stop system is accomplished through command sets generating secure codes, rolling codes, or otherwise encrypted signals to the PV Stop controlled equipment. This security provision also prevents unauthorized regeneration in any disabled equipment or system controlled by PV Stop until inspection/verification that equipment and system integrity is assured.

Example 3

The PV STOP, POTENTIAL VOLTAGE AND HAZARD STOP SYSTEMS embodied in the FIGS. 1-30 are capable, either singly or in multiples, of controlling any electric, mechanical, pipe flow, gas flow, chemical flow, material flow, any powered machine, any combustion machine or vehicle, any electrical vehicle, any valve of any type, or any array of similar or dissimilar utilization equipment, over any distance in any size or configuration of residence, business, industrial or manufacturing facility, power plant, co-generation plant, process plant or venue. Through a series of "Daisy Chained" Wireless (or wired) Controlled Personality Modules, any range limitations of signal can be overcome. In a number of tests, indoors and outside, distances up to 200 feet of effective control of equipment and PV Modules was confirmed. The range of signal can be modified by frequency, signal strength, differing transmitter/transceiver/receiver equipment and antenna modification to accommodate longer range as well.

The preceding examples can be repeated with similar success by substituting the generically or specifically described reactants and/or operating conditions of this invention for those used in the preceding examples.

Note that in the specification and claims, "about" or "approximately" means within twenty percent (20%) of the numerical amount cited.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), are hereby incorporated by reference.

What is claimed is:

1. A system for personnel at readily accessible locations comprising:
    an enclosure, said enclosure comprising a modular main control panel enclosure containing a communications module used to transmit and receive data to/from junction boxes/enclosures that are paired to it, and a processor board handling all front panel peripherals, displays, devices, and interaction, interfacing one or more components within said modular main control panel enclosure to external devices, supporting protocols for remote operation and telemetry, data logging for performance and forensic applications, and interaction with security and/or fire systems;
    wherein said main control panel enclosure monitors contact closures that are interfaced as needed to existing or future devices to allow these devices to request a shutdown of a PV module or modules;
    within said enclosure, one or more electrical and, if present, mechanical transmitting and receiving devices, including connection to at least one PV supply source; and
    within said enclosure, one or more microprocessors or controllers that via a relay electrically connected to junction box lead lines switch completely off the source or line supply of all potentially hazardous equipment or energized/charged systems in a facility;
    an indicator configured to provide an audible and/or visual indication that power is either off or on;
    the system requiring a lockout code or lockout mechanism in order to re-energize the source or line supply;
    wherein one or more devices to effect on or off status of a solar PV energy system at the immediate location of the tabs or busbars exiting the PV module prior to the terminal blocks in a junction box/enclosure, inverter or combination inverter/junction box/enclosure so as to be able to render all conductive elements downstream of the busbar/tabbing of the solar unit in either on or off status; and
    wherein the junction box/enclosure provides safe operation of the attached equipment to prevent unsafe or unexpected startup, unsafe or unexpected shutdown, or improper sequencing, any of which could potentially occur after a loss of power at the junction box/enclosure, main control panel, or both.

2. The system of claim 1 additionally comprising a power interrupting/reconnecting and status notification system for Solar PV or other Solar energy/heating power system or other electrical power source.

3. The system of claim 2 additionally comprising components for power interrupting/reconnecting on individual, multiple strings, or entire arrays of solar energy producing systems.

4. The system of claim 1 wherein said system physically and completely shuts off at least all PV power, all incoming electrical power, and all incoming natural gas supplies.

5. The system of claim 2 comprising one or more of the group consisting of a voice enunciation device in the vicinity of the solar installation delivering audible status, one or more devices delivering a visual output of system status selected from the group consisting of LED/LCD panel, display of system voltage, and display of current output.

6. The system of claim 1 additionally comprising one or more devices for service technicians or first responders to initiate system shut down or re-energizing of any charged or energized system remotely transmitted or on-site signal delivery via wired, wireless, Bluetooth, WiFi, internet to effect single, multiple, string, or entire system on/off via touch, voice command, any smart phone, telecom, internet, via differing frequency.

7. The system of claim 1 additionally comprising control electronics located within the junction box/enclosure to permit relaying of control signals from one location to another when they are too far away from the main control box for reliable activation when used with wireless communications.

8. The system of claim 1 additionally comprising control electronics located within the junction panel to permit transmission to the main control box of the PV panel temperature, panel output voltage, panel output current, and panel operation time.

9. The system of claim 1 additionally comprising control electronics located within the junction box/enclosure to permit transmission, to the main control panel, of parameters of interest gatherers from the equipment being controlled or monitored, temperature, pressure, force, volume, time intervals, weight, color, resistance, voltage, current, and/or flow.

10. The system of claim 1 additionally comprising one or more switches inside the junction box/enclosure to permit the control electronics to "pair" with the main control box in an encrypted manner.

11. The system of claim 1 additionally comprising circuitry in the junction box/enclosure electronics to allow for testing of the panel, including one or more of the group consisting of open-circuit voltage, short-circuit current, maximum power parameters, peak power, fill factor, and module efficiency.

12. The system of claim 1 additionally comprising circuitry in the junction box electronics causing the last shut-off command from the main control box to be maintained even across power cycling of the PV equipment.

13. The system of claim 1 additionally comprising one or more devices to effect a single throw, double pole, or single throw, any other plurality of poles, or a multiple throw and any other plurality of poles in the switching relay or interrupt, regenerating device.

14. The system of claim 1 wherein the junction box/enclosure is configured so that at time of assembly, the unit can be configured for full control by installing a transceiver PCB assembly, or it can be configured as a standard junction box by installing another PCB assembly comprising only tab wire connectors, diodes, and output connectors.

15. The system of claim 1 wherein the junction box/enclosure PCB assemblies carry bypass diodes.

16. The system of claim 1 wherein the junction box/enclosure PCB assembly employs heat sinks for bypass diodes that are implemented as large copper areas on the top and/or bottom sides of the board and filled vias couple top and bottom heatsink areas.

* * * * *